UNITED STATES PATENT OFFICE.

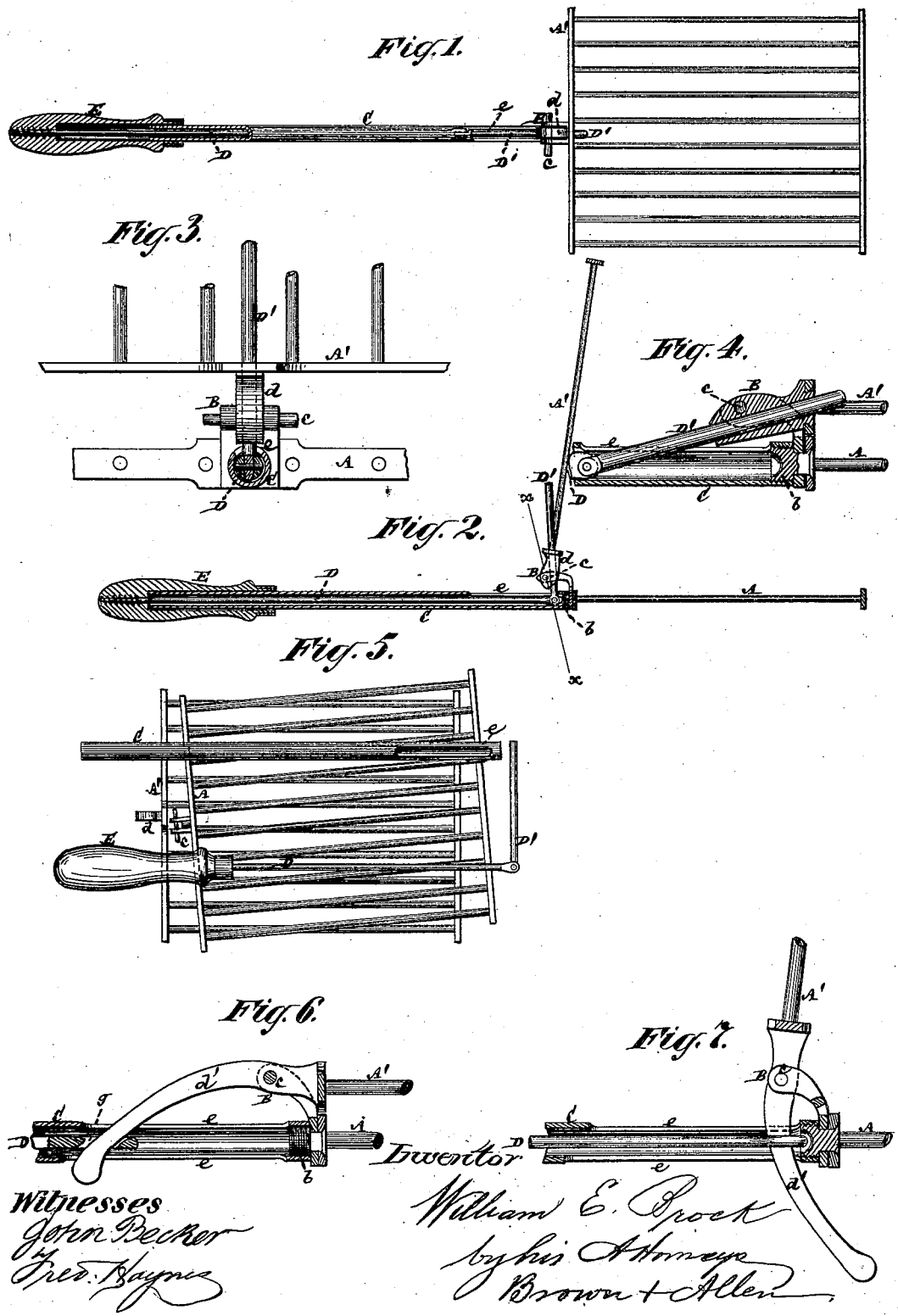

WILLIAM E. BROCK, OF NEW YORK, N. Y., ASSIGNOR TO JOHN J. TOWER, OF SAME PLACE.

IMPROVEMENT IN CULINARY UTENSILS FOR BROILING, TOASTING, &c.

Specification forming part of Letters Patent No. 195,087, dated September 11, 1877; application filed August 3, 1877.

*To all whom it may concern:*

Be it known that I, WILLIAM E. BROCK, of the city of New York, in the State of New York, have invented certain new and useful Improvements in Culinary Utensils for Broiling, Toasting, and other purposes, of which the following is a description, reference being had to the accompanying drawing, forming part of this specification.

This invention relates to what are commonly known as "griddles," for broiling and toasting purposes, and more especially to that description of said griddles which consists of two gridirons or frames that serve to hold the substance to be broiled or toasted in between them, and which open and close in relation with each other, and, when closed, admit of the griddle being reversed, to expose opposite sides of the substance being cooked to the action of the fire.

My invention consists in a reversible griddle, having its two gridirons or frames connected, so that the one frame is opened and closed relatively to the other by the sliding of the handle of the griddle through mechanism connected with said handle, free from any outward extension of the griddle or of the means used to open and close it.

It also consists in a novel combination of devices with the sliding handle and hinged gridirons or frames, whereby the two frames are kept closed when shut without any special manipulation to secure them, and other advantages are obtained.

Furthermore, the invention consists in a certain construction of the several parts, whereby increased facility is afforded for packing the griddles in a small space or compass when being transported.

Figure 1 represents a partly-sectional top view of a reversible or two-framed griddle having my invention applied, and showing the gridirons or frames closed. Fig. 2 is a vertical longitudinal section of the same, showing the opening and closing gridiron or frame as thrown up or open. Figs. 3 and 4 are views, upon a larger scale, of the jointed or hinged portions of the two gridirons or frames, together with certain devices for opening and closing one of said frames; Fig. 3 being a transverse section on the line $x\,x$, showing the griddle open; and Fig. 4, a longitudinal section, showing the griddle closed. Fig. 5 is a plan of the griddle when dismembered for transportation. Figs. 6 and 7 are longitudinal sections of corresponding parts to those represented in Fig. 4, but showing a modified device for opening and closing the griddle; Fig. 6 showing the griddle as closed, and Fig. 7 the griddle as open.

Referring, in the first instance, to the first five figures of the drawing, A A' represent the two gridirons or frames, connected together at their inner sides by a hinge-joint, B, to allow of the frame A' being opened and closed for the purpose of entering the substance to be cooked between the frames, of holding it there, and of removing it therefrom. The other frame, A, which is the stationary one, is directly carried by the shaft or stem C of the griddle, said shaft or stem being made tubular, and constructed to screw at its inner end onto a screw-shank, $b$, fast to the inner side bar or piece of the frame A. Thus arranged, the movable gridiron or frame A' opens when raised toward the handle end of the griddle.

The joint B of the griddle-frames A A', of which $c$ is the joint-pin, is bent or turned toward the handle end of the griddle, above or exterior to the stem C, and the central jaw $d$ of said joint is made hollow or tubular in an inclined direction relatively to the faces of the gridirons, as shown in Fig. 4.

Arranged longitudinally within the hollow shaft or stem C of the griddle is a rod, D, made fast at its outer end to a handle, E, and having jointed to it, at its forward end, an extension-bar, D', which is projected out through a slot, $e$, in the stem or shaft C, and through the central jaw $d$ of the movable gridiron or frame A'. The handle E is also made hollow, and so that it is free to slide upon or along the stem or shaft C.

The parts being thus constructed, it is only necessary, in order to open the griddle, to force or slide inward along the tubular shaft or stem D the handle E. This causes the extension-bar D' to be projected through the inclined tubular jaw $d$, and so open or raise the movable gridiron or frame A', as shown in Figs. 2 and 3. Upon drawing back or outward the sliding handle E, the extension-bar D', by its action on or within the inclined tubular jaw $d$, is made to close the movable gridiron or frame A', as shown in Figs. 1 and 4, and to hold the frames A A' closed.

Inasmuch as the extension-bar D' only projects through that side of the stem or shaft C which is next to the movable frame A', said bar offers no impediment to the placing of the griddle by its stationary frame A on a table or other level surface, which will be found very convenient in various cooking operations.

To facilitate transportation, it is only necessary to withdraw the joint-pin $c$, to unscrew the hollow stem or shaft C from the gridiron or frame A, and to draw out the rods D D' from the stem C, when the several parts and the two frames A A' may be packed together in a comparatively very small space or compass, as shown in Fig. 5.

In Figs. 6 and 7 of the drawings, the rod D, which is operated by the sliding handle of the griddle, and which is arranged within the tubular stem or shaft C, instead of having an extension-bar D' jointed to its inner end, has a slot, $g$, through it, and the stem C has a slot, $e$, on opposite sides of it, and the central jaw $d'$ of the frame A' is made solid, and suitably curved or shaped to pass through the slots $g$ and $e$ of the stem and its inclosed rod. The opening and closing action, however, of the frame A', by sliding the handle E in or out, is the same as in the other modification shown in Figs. 1, 2, 3, and 4 of the drawing.

A reversible griddle constructed in accordance with this invention is light, convenient to manipulate, occupies but little space when opened, requires no special means to secure it when closed, and may readily be dismembered to facilitate transportation.

I claim—

1. The combination, with the opening and closing gridiron or frame and shaft or stem of the stationary gridiron or frame, of the handle constructed to slide on or along said shaft or stem, and having combined with it mechanism or devices for both opening and closing the movable gridiron or frame by the sliding motion of the handle, essentially as specified.

2. The combination of the jointed extension-bar D' with the rod D, the sliding handle E, and the tubular jaw $d$ of the movable gridiron or frame A', substantially as and for the purposes herein set forth.

3. The combination of the tubular slotted stem or shaft C with the screw $b$, the stationary gridiron or frame A, the detachable movable frame A', and the detachable sliding handle E, and means for opening and closing said movable frame, whereby the packing of the parts in a small space or compass is facilitated, substantially as described.

In testimony whereof I hereunto sign my name in the presence of two subscribing witnesses.

WILLIAM E. BROCK.

Witnesses:
 BENJAMIN N. HOFFMAN,
 EDWARD B. SPERRY.